United States Patent [19]
Wolf et al.

[11] Patent Number: 5,415,504
[45] Date of Patent: May 16, 1995

[54] NEST DRILL TUBE

[75] Inventors: Barry J. Wolf, Carrot River; Murray McEwan, Tisdale, Canada

[73] Assignee: Barry Wolf Farms Ltd., Carrot River, Canada

[21] Appl. No.: 138,055

[22] Filed: Oct. 19, 1993

[30] Foreign Application Priority Data

Oct. 21, 1992 [CA] Canada .................................. 2081033

[51] Int. Cl.6 ............................................. B23B 51/04
[52] U.S. Cl. ..................................... 408/204; 408/703
[58] Field of Search ............... 408/204, 205, 207, 703; 30/278; 128/754; 606/180/184

[56] References Cited

U.S. PATENT DOCUMENTS

| | | | |
|---|---|---|---|
| 1,219,677 | 3/1917 | Sparks | 408/204 |
| 1,279,495 | 9/1918 | Dom | 408/204 |
| 1,557,464 | 10/1925 | Mick | 408/205 |
| 3,512,519 | 5/1970 | Hall | 408/205 |
| 4,621,956 | 11/1986 | Hartman et al. | |
| 5,098,234 | 3/1992 | Judkins et al. | 408/204 |

FOREIGN PATENT DOCUMENTS

| | | | |
|---|---|---|---|
| 1053938 | 5/1979 | Canada . | |
| 1078650 | 6/1980 | Canada . | |
| 777245 | 11/1934 | France | 408/205 |
| 2631138 | 1/1978 | Germany | 408/204 |
| 975424 | 11/1982 | U.S.S.R. | 408/204 |

Primary Examiner—Daniel W. Howell
Attorney, Agent, or Firm—Murray E. Thrift; Adrian D. Battison; Stanley G. Ade

[57] ABSTRACT

Rigid foam material, for example, expanded polystyrene foam, is drilled using a bit that forms an annular slit in the foam material and compresses the block temporarily around the slit. This frees the core for ready removal. The drill bit has a cutting ting at the leading end with an inside cutting edge and an annular bevel leading from the cutting edge to the outside surface of the cutting ring. The cutting ring is mounted on the leading end of a tube with an inside diameter greater than the inside diameter of the cutting ring in order to clear the core and an outside diameter less than the outside diameter of the cutting ring in order to clear the surrounding foam material.

8 Claims, 3 Drawing Sheets

NEST DRILL TUBE

FIELD OF THE INVENTION

The present invention relates to drills and more particularly to drills for drilling holes in rigid foam material. The invention also relates to a method of drilling a hole in such material.

BACKGROUND

In the use of rigid foam material, e.g., expanded polystyrene, it is often necessary to cut small diameter holes in the foam. For example, in the manufacture of leaf cutter bee nest blocks, it is necessary to form hundreds of small holes through each block. This is conventionally done using a twist drill, which cuts chips from the foam body, followed by an air blast to remove chips of foam from the hole. A reamer is then used to finish the hole then the hole is cleaned out using another air blast.

SUMMARY

The present invention provides an improved method of forming holes of this type and an improved drill for carrying out the method.

According to one aspect of the present invention there is provided a drill bit comprising:

a substantially cylindrical tube having a leading end, a trailing end and predetermined inner and outer diameters, and an annular cutting ting secured to the leading end of the tube, the cutting ting having an outside surface with an outer diameter greater than the outer diameter of the tube, an inside surface with an inner diameter less than the inner diameter of the tube, and an annular curing edge at a leading end thereof.

Preferably, the curing edge is at the inside of the ring and the leading end of the cutting ting is bevelled from the curing edge. The annular cutting edge cuts a cylindrical core from the foam block, eliminating most chips. The core is smaller than the inside diameter of the tube, so that the core can be ejected readily from the tube without large frictional resistance. Ejection can be by air blast or by the penetration into the tube of the next following core.

The tapered leading end of the cutting ring temporarily compresses the material around the hole so that the tube does not rub on the foam throughout its length, thus minimizing friction and heat buildup. The wall thickness of the tube is preferably in the range 0.010 inch (0.25 mm) to 0.020 inch (0.51 mm) in order to prevent overheating of the drill while in operation.

According to another aspect of the present invention there is provided a method of cutting a cylindrical hole in a body of rigid foam material, said method comprising cutting an annular slit in the body and compressing the body around the annular slit to provide an annular keff leading to the slit so as to free a core surrounded by the slit from the body.

By compressing the body around the cut to provide a clearance between the core and the surrounding body, the core is readily withdrawn from the hole without significant binding.

BRIEF DESCRIPTION OF THE DRAWINGS

In the accompanying drawings, which illustrate an exemplary embodiment of the present invention.

DETAILED DESCRIPTION

Figure 1:
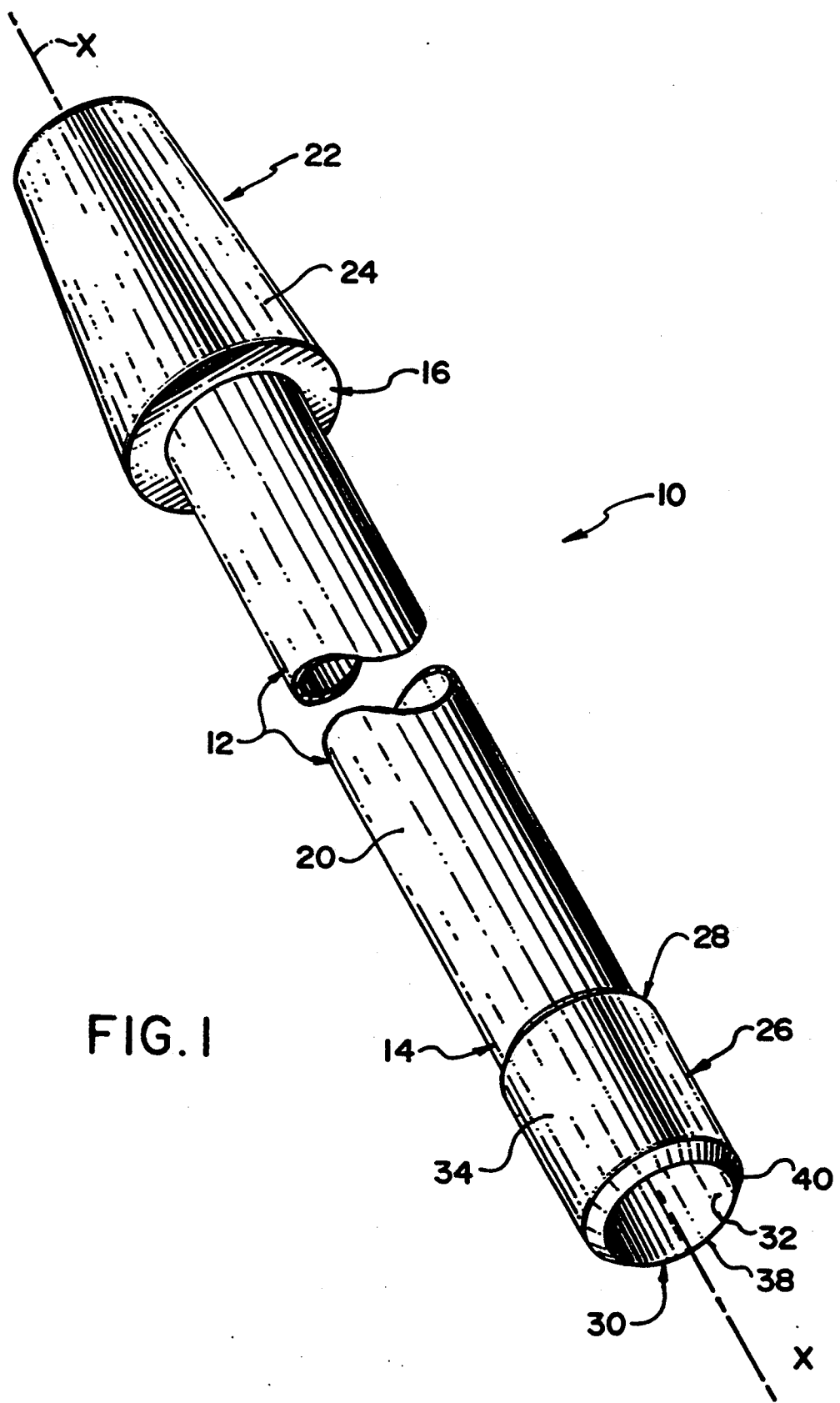
FIG. 1 is isometric view of a drill bit according to the present invention.
Figure 2:
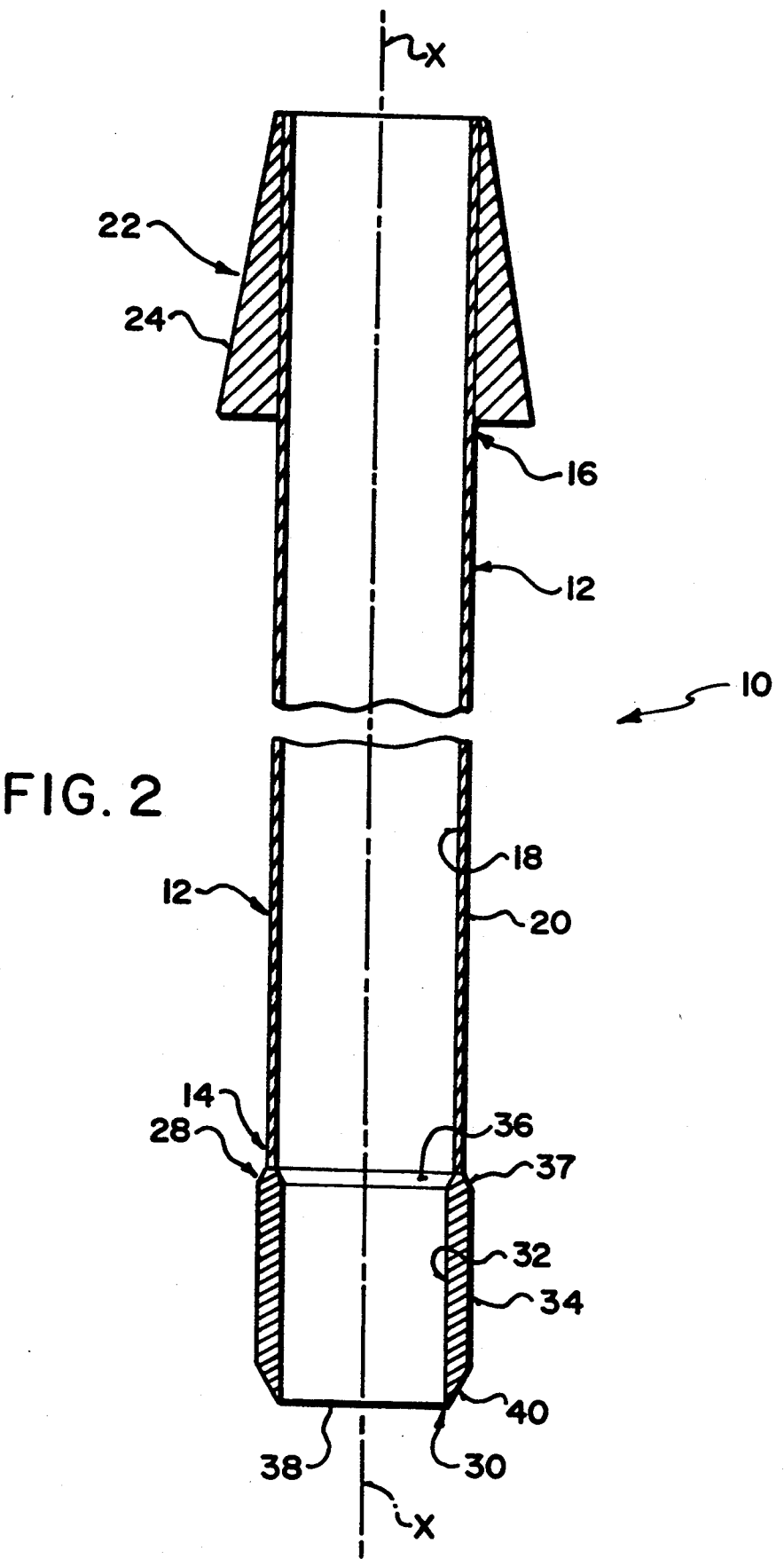
FIG. 2 is a longitudinal cross section of the bit in FIG. 1.

Referring to the accompanying drawings, there is illustrated a drill bit 10. The main body of the bit is a cylindrical tube 12 with a leading end 14 and a trailing end 16. The tube has an inner cylindrical surface 18 and a concentric cylindrical outer surface 20. The trailing end of the tube is connected to a shank 22 with an outer tapered surface 24 for engagement in a drill chuck. The shank is hollow, with an inside diameter that matches that of the tube.

At the leading end 14 of the tube 12 is a concentric cutting ring at 26. The ring is approximately 0.25 inch (6.4 mm) long between its trailing end 28 and its leading end 30. The ring has a cylindrical inside surface 32 that is approximately 0.004 inch (0.10 mm) smaller than the inside diameter of the tube inner surface 18. The outside surface 34 of the cutting ring has an outside diameter approximately 0.005 inch (0.12 mm) greater than the diameter of the outer surface 20 of the tube 12. At the trailing end of the cutting ring 26 are internal and external bevels 36 and 37 respectively leading from the inside and outside surfaces to the inside and outside surfaces of the tube. At the leading edge of the cutting ting, at the inside surface, is a smooth, circular cutting edge 38 lying in a plane perpendicular to the axis x—x of the tube 12. A bevelled surface 40 leads from this cutting edge to the outside surface 34 of the cutting ring.

Figure 3:
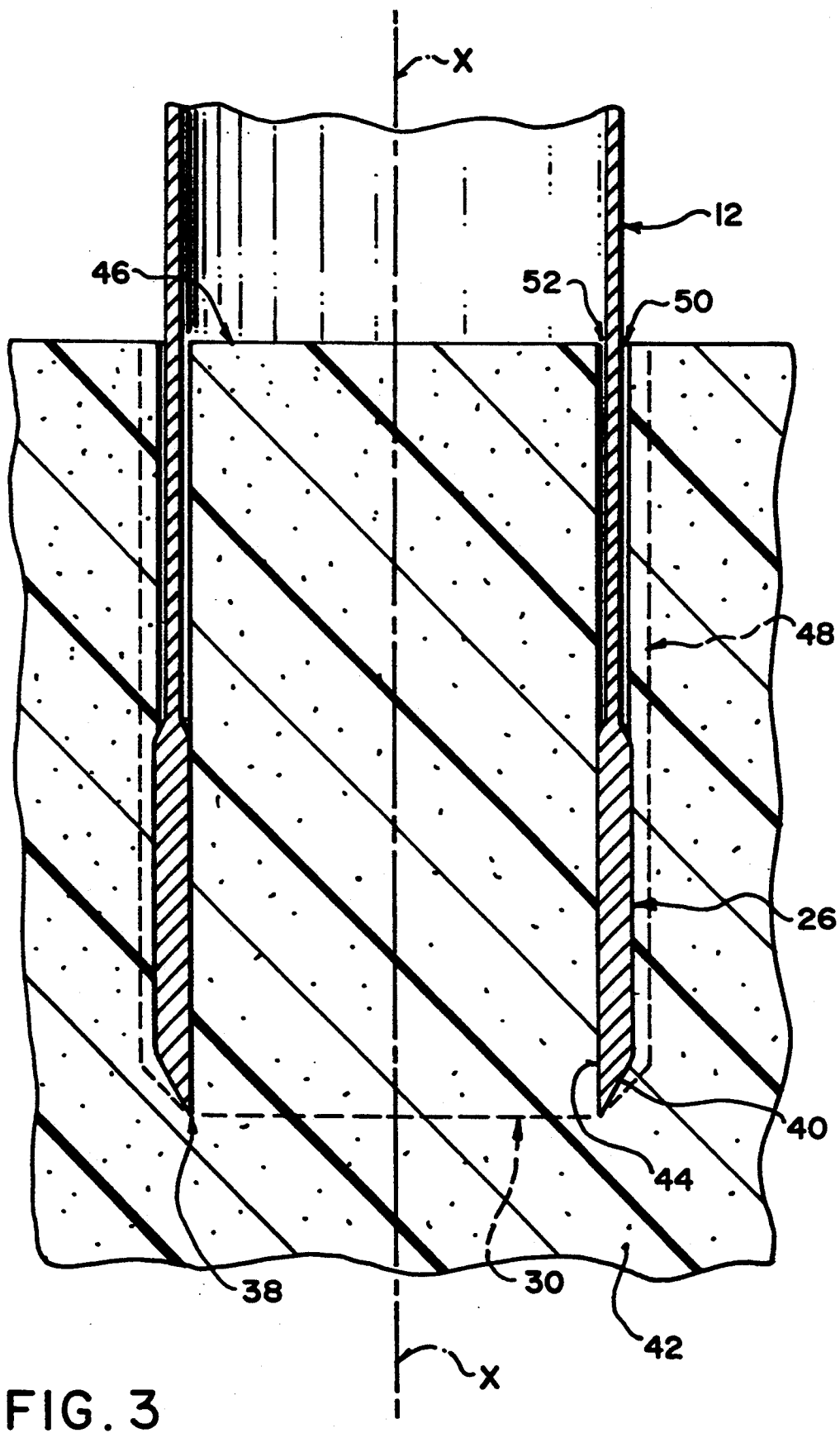
FIG. 3 is an enlarged detail cross section showing the cutting end of the drill bit in use.

The use of the drill bit in cutting a cylindrical bore through a foam block is illustrated most particularly in FIG. 3. As illustrated in that drawing, the drill bit is rotated and advanced into the block 42 with the cutting edge 38 forming a cylindrical slit 44 in the block of foam material. The rotating circular knife edge on the cutting ring slices the foam material. As the drill advances into the foam material, it separates a cylindrical core 46 from the body of the foam. The bevelled surface 40 at the outside of the cutting ring compresses a zone 48 of the block immediately to the outside of the slit. Because of the slow rebound characteristics of the block, the leaves a temporary clearance 50 between the hole in the block and the outer side of the tube 12. This minimizes frictional resistance to the rotation and advancement of the tube in the hole. At the same time, a clearance 52 is formed between the compressed side of the hole and the core 46 so that the core may easily be withdrawn from the hole without binding.

While one embodiment of the present invention has been described in the foregoing, it is to be understood that other embodiments are possible within the scope of the present invention. Thus, the dimensions given above for the relative sizes of the tube and cutting ting, the length of the tube and other parameters of the drill may be varied without departing from the present invention. The present invention is to be considered limited solely by the scope of the appended claims.

We claim:

1. A drill bit comprising:
a substantially cylindrical tube having a leading end, a trailing end and predetermined inner and outer diameters, and an annular cutting ring secured to the leading end of the tube, the cutting ring having a cylindrical outside surface with an outer diameter greater than the outer diameter of the tube, a cylindrical inside surface with an inner diameter less than the inner diameter of the tube, an annular, smooth cutting edge at a leading end and the inside surface of the cutting ring and a bevelled surface leading from the cutting edge to the outside surface of the cutting ring.

2. A drill bit according to claim 1 including a chuck-engaging shank mounted on the trailing end of the tube.

3. A drill bit according to claim 1 wherein the tube has a wall thickness in the range of 0.010 inch to 0.020 inch.

4. A drill bit according to claim 1 wherein the outside diameter of the cutting ring is approximately 0.005 inch greater than the outside diameter of the tube.

5. A drill bit comprising:

a substantially cylindrical tube having concentric inner and outer surfaces, a leading end and a trailing end;

shank means secured to the trailing end of the tube for securing the tube to a rotating drill drive; and a cutting ring secured concentrically to the leading end of the tube and having an inner cylindrical surface with a diameter less than the diameter of the inner surface of the tube, an outer cylindrical surface with a diameter greater than the diameter of the outer surface of the tube and a bevelled leading face leading from the outer cylindrical surface of the cutting ring to an annular cutting edge at the inner cylindrical surface of the cutting ring.

6. A drill bit according to claim 5 wherein the robe has a wall thickness in the range of 0.010 inch to 0.020 inch.

7. A drill bit according to claim 5 wherein the outside diameter of the cutting ring is approximately 0.005 inch greater than the outside diameter of the tube.

8. A drill bit according to claim 7 wherein the inside diameter of the cutting ring is approximately 0.004 inch less than the inside diameter of the tube.

* * * * *